(No Model.)
C. L. KNEELAND.
MILK COOLER.
No. 288,711. Patented Nov. 20, 1883.
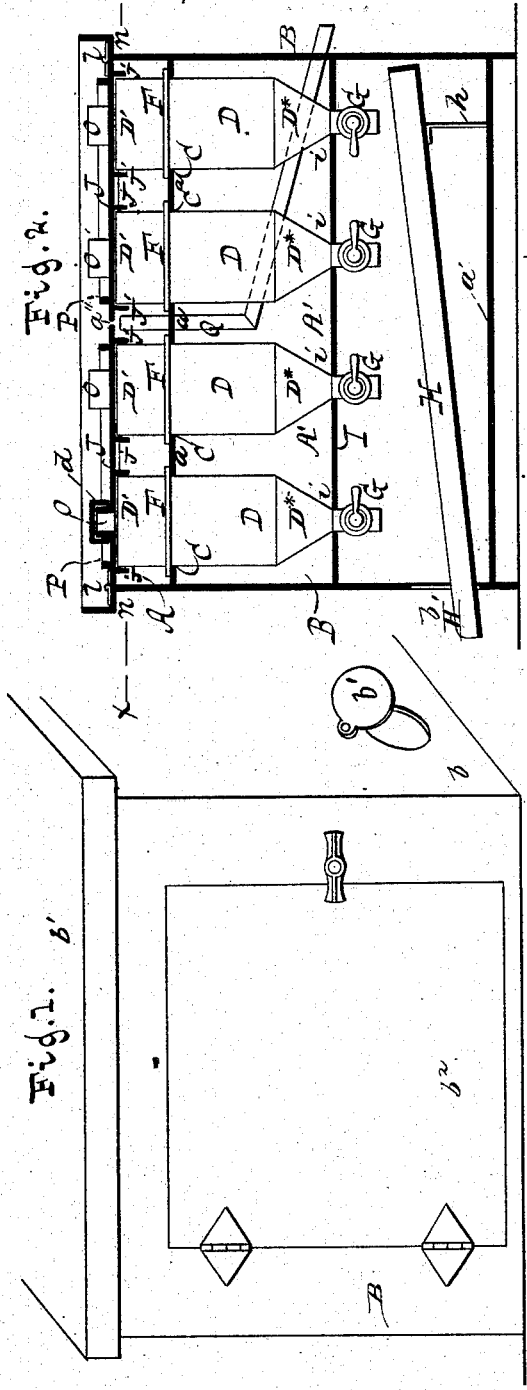
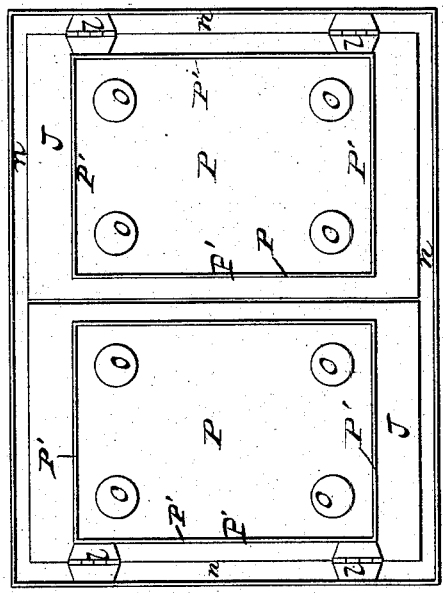
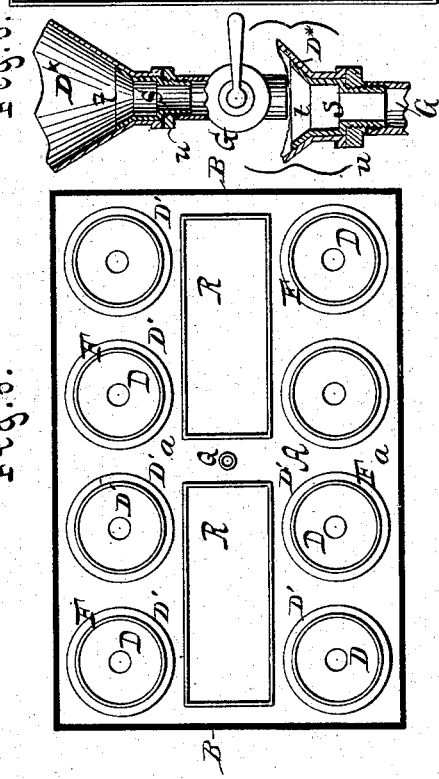
Witnesses.
Wm E. Richards
K. M. Supple
Inventor.
Charles L. Kneeland,
By G. Richards
Atty's.

UNITED STATES PATENT OFFICE.

CHARLES L. KNEELAND, OF MARGARETVILLE, NEW YORK.

MILK-COOLER.

SPECIFICATION forming part of Letters Patent No. 288,711, dated November 20, 1883.

Application filed November 14, 1881. Renewed August 2, 1883. (No model.)

*To all whom it may concern:*

Be it known that I, CHARLES L. KNEELAND, of Margaretville, in the county of Delaware and State of New York, have invented certain new and useful Improvements in Milk-Coolers, of which the following is a specification.

My invention relates to improvements in that class of milk-coolers wherein the milk vessels or receivers discharge at the bottom, and wherein the cooling medium employed is water, either used alone or in combination with ice. The water is supplied at the upper part of the device.

The drawings illustrate what I consider the best means of carrying out the invention.

Referring to the drawings, Figure 1 is a partial perspective view of my improved device. Fig. 2 is a vertical longitudinal section of the same. Fig. 3 is a horizontal section on the line $x$ $x$, Fig. 2. Fig. 4 is a plan or top view, and Fig. 5 a detail view, on a larger scale, showing the spout-coupling.

In each of the views similar letters of reference indicate like parts wherever they occur.

A represents a chamber or vat formed in the upper part of a cabinet, B, and adapted to receive the cooling medium. In the bottom $a$ of the chamber A are formed a series of openings, C, adapted for the reception of the milk-receivers D, each of which is formed with a circumferential flange, F, whereby they are supported on the bottom $a$ of the chamber A, with their lower portion protruding therethrough into a chamber, A', below. In order to secure a water-tight joint between the flanges F and the bottom $a$, a packing ring or washer may be interposed between them. The receivers D are formed conical at their lower ends, D*, and are adapted to receive a spout, G, through which the milk may be drawn off, when desired, into a trough, H, which at one end is supported on legs $h$, resting on the bottom $a'$ of the chamber A', while its opposite or delivery end, H', is supported on the lower side of an opening, $b$, in the side of the device, in a line with the rows of receivers D. The openings C in the bottom $a$ are arranged in rows, thereby bringing the receivers D to a corresponding position. The trough H is movable, so that it can be brought directly beneath either row of receivers D, for the purpose of emptying the same. The trough H is inclined toward the opening $b$, through which it projects when in operation, in order to allow of the milk being received and held in suitable vessels. Access is obtained to the chamber A' for the purpose of placing the trough H in position, or for removal, and also for operating the spouts G, by means of doors $b^2$, arranged on opposite sides of the cabinet B.

The chamber A' is provided with shelves I, formed with holes or apertures $i$, adapted to receive the lower ends of the conical portions D* of the receivers D, thereby insuring the same against accidental lateral displacement, and the consequent leakage of the cooling medium from the chamber A into the chamber A'.

The cooling-chamber A is provided with a lid, J, which, as shown in the drawings, is formed in two halves, each of which is hinged at $l$ to the bottom of the projecting trough or ledge $n$, formed on or affixed to the upper sides of the chamber A, a space, $a''$, being left between the ends of the halves of the lid J for the passage of water, as hereinafter explained.

The receivers D are formed with open tops D', which are closed when the halves of the lid J are closed down by means of circular projecting flanges J', one of which is arranged to surround each receiver D. The flanges J' are formed on or affixed to the halves of the lid J. Upon the upper side of the halves of the lid J, above each receiver D, and in the center of each of the flanges J', I form a nipple, O, projecting upward, and adapted to be closed by a screw or other suitable cap, $d$. The object of these nipples O and caps $d$ is to allow of the escape of the animal heat, as also of the odor from the milk when the caps $d$ are removed during the time the milk is cooling. The halves of the lid J are each formed with flanges P', extending continuously around the same, thereby forming tanks P, which, when water is used as the cooling medium, form the first receptacle for the same. The flanges P' are by preference formed of a height slightly less than the height of the nipples O, in order that water may not flow into the receivers D. The water is allowed to flow from the tanks P over the flanges P', and by means of the opening $a''$ into the chamber A, from which it is allowed to escape by means of an overflow-pipe, Q, the upper end of which is arranged slightly below the tops D' of the receivers D, thereby preventing any accidental influx of water to the milk. The overflow-pipe Q is conducted through the side of the cabinet B, and delivers its water to any suitable receiver or conduit.

R R are ice-boxes arranged centrally in the chamber A, between the milk-receivers D, as shown in Fig. 3, for the purpose of cooling the water in the chamber A, when necessary. The ice is thereby isolated from the water in the chamber A; but, if desired, on special occasions ice may be placed in other parts of the chamber A, and also in the tanks P. The object of the tanks P is to present a cooling-surface above the milk-receivers D, thereby increasing the cooling-area of the chamber A. Rims are formed on the under side of each of the halves of the lid J, thereby forming covers for the ice-boxes R R.

The milk-receivers D are preferably formed of glass, to allow of the easy inspection of their contents, and the spouts G are applied thereto in the following manner:

Within the tapering bottoms $D^*$ of the receivers D is applied a coupling, S, (see Fig. 5,) which is formed with a flaring top flange, $t$, adapted to be received and held securely in the taper of the bottom $D^*$ of the receiver D. The lower end of the coupling S is screw-threaded, and adapted to receive a nut, $u$, which, when screwed up into position, bears against the bottom edge of the conical portion $D^*$ of the receiver D, thus firmly holding the flange $t$ in position. Upon the portions of the coupling S projecting beyond or below the nut $u$ is formed a screw-thread adapted to engage with a thread correspondingly formed in the spout G. The flanges and nuts may be packed in any suitable manner. By this construction the spouts and couplings may be readily applied and removed, at the same time, when properly placed in position, forming a very secure joint.

The openings $b$ in the side of the cabinet B are closed, when desired, by pivoted or hinged flaps or doors $b'$.

Having thus described my invention, what I claim, and desire to secure by Letters Patent, is—

1. The combination, with a milk-cooler cabinet, B, provided with chambers A A', and ice-boxes R, as described, of the receivers D, constructed as described, and the hinged lid J, provided with flanges J' on its under side, and with overflow-water-receiving tanks P, nipples O, and caps $d$ on its upper side, the whole being arranged and adapted to operate substantially as shown and described.

2. The combination, with a milk-cooler cabinet, B, formed with upper and lower chambers, A and A', and milk-receivers D, constructed as described, of the lid J, provided with flanges J', overflow-water-receiving tanks P, nipples O, and caps $d$, and the overflow-pipe Q, substantially as and for the purpose shown and described.

3. The combination, in a milk-cooler cabinet, B, formed with an upper water-chamber provided with ice-tanks R, of a removable cover or lid, J, provided with flanges J', overflow-water-receiving tanks P, nipples O, caps $d$, removable milk-receivers D, formed with tapering bottoms $D^*$, couplings S, flanges $t$, nuts $u$, and spouts G, substantially as shown and described.

CHARLES L. KNEELAND.

Witnesses:
E. L. HITT,
J. W. KITTEL.